W. LUNDSTROM.
POST HOLE DIGGER.
APPLICATION FILED NOV. 11, 1916.
1,237,070.
Patented Aug. 14, 1917.
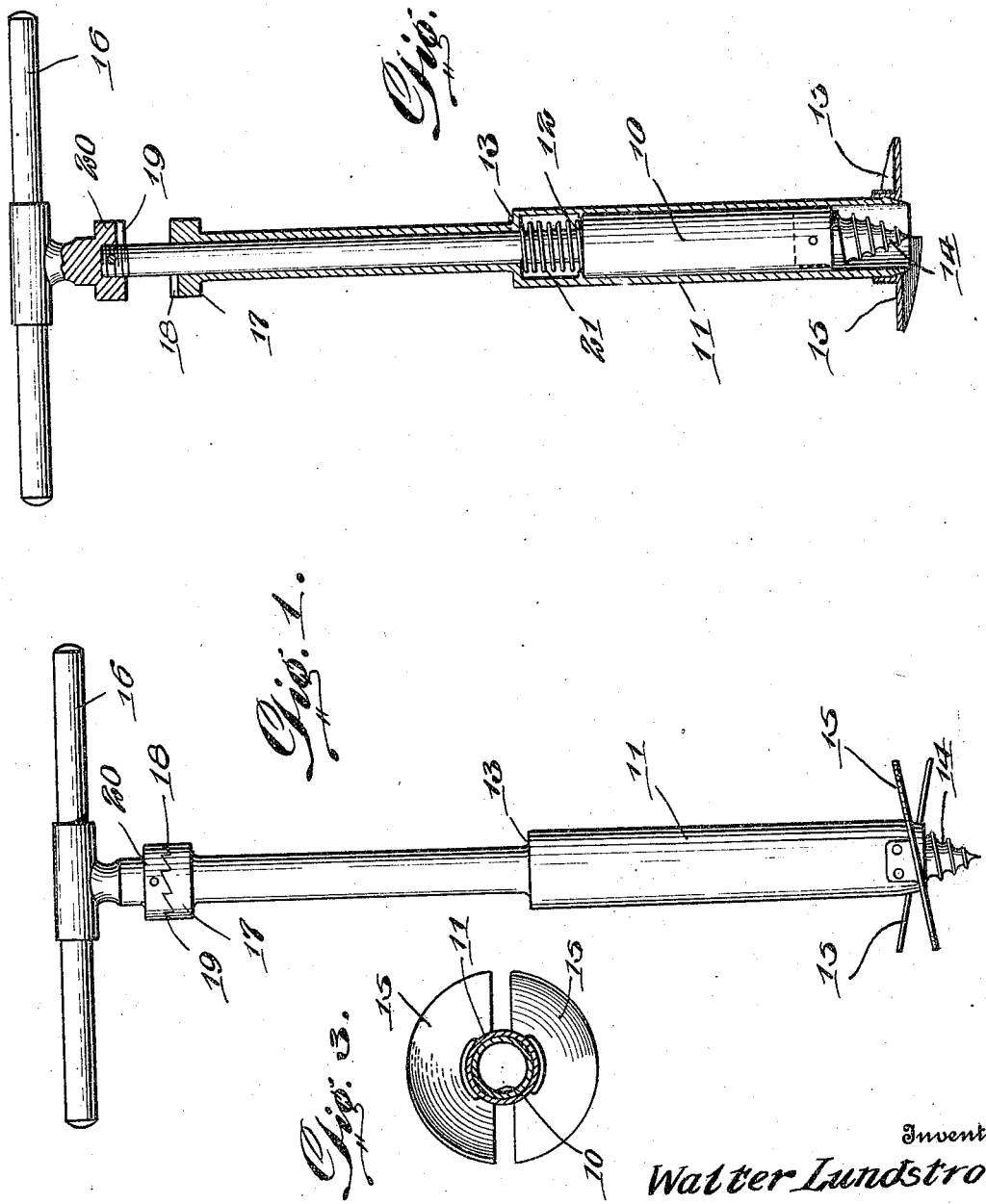

UNITED STATES PATENT OFFICE.

WALTER LUNDSTROM, OF ALMONT, MONTANA.

POST-HOLE DIGGER.

1,237,070.   Specification of Letters Patent.   Patented Aug. 14, 1917.

Application filed November 11, 1916. Serial No. 130,832.

*To all whom it may concern:*

Be it known that I, WALTER LUNDSTROM, a citizen of the United States, residing at Almont, in the county of Morton and State of North Dakota, have invented new and useful Improvements in Post-Hole Diggers, of which the following is a specification.

This invention comprehends the provision of a post hole digger embodying a novel combination and construction of parts to facilitate the handling and manipulation of a device of this character, the invention residing within the scope of what is claimed.

To this end the invention embodies among other features an inner and an outer tubular member, each carrying a cutting element and a coöperating clutch member which permits said members to be operated in unison, and one reversed independently of the other whereby the device can be manipulated from a given position of the operator and without changing the position of the hands.

The nature and advantages of the invention will be better understood when the following detail description is read in connection with the accompanying drawing, wherein like numerals of reference indicate similar parts in the several views and in which:—

Figure 1 is an elevation of the device constructed in accordance with my invention.

Fig. 2 is a longitudinal sectional view therethrough showing the clutch members separated.

The device constructed in accordance with my invention embodies an inner tubular member 10, and an outer concentrically disposed tubular member 11 which parts may be constructed from any suitable material, and dimensions without departing from the spirit of the invention. These members are similar in the respect that each is provided with a reduced portion defining a shoulder, the shoulder of the inner member being indicated at 12 and the shoulder of the outer member being indicated at 13. These shoulders are provided for a special purpose which will be hereinafter clearly set forth. The auger 14 is formed on the lower extremity of the inner member 10 and projects an appreciable distance beyond the corresponding extremity of the outer member 11, while cutting blades 15 are secured to the outer member 11 in the vicinity of the auger 14, the blades 15 being disposed at any suitable angle with respect to each other in the most advantageous position consistent for the purpose for which they are intended. The inner member 10 projects an appreciable distance above the corresponding extremity of the outer member 11 and has secured thereto in any suitable manner a cross handle 16. Upon the member 11 at a point immediately beneath the handle 16 is a nut 17 having a clutch engaging surface 18 adapted to coöperate with the clutch engaging surface 19 of a similar nut 20 secured upon the upper extremity of the inner member 10. The nuts 17 and 20 respectively constitute clutch engaging members which when operatively associated permit the inner and outer members as a unit to be rotated through the instrumentality of the handle 16. Encircling the reduced portion of the inner member 10 is an extensile spring 21 having one end bearing against the shoulder 12 of said member, and its opposite extremity bearing against the shoulder 13 of the outer member, this spring operating to force the respective members in opposite directions, and obviously maintaining the clutch members 17 and 20 respectively associated. With the clutch members thus associated the operator can retain the initial purchase obtained upon the handle 16 during the operation of the device, because as the handle 16 is rotated in one direction the inner and outer members respectively are rotated as a unit, but the handle 16 may be reversed together with the inner member 10 independently of the outer member 11, and again rotated in a proper direction to drive the inner and outer members in the ground in unison. In other words the clutch members permit the tool to be operated with a ratchet principle, which renders the device in its entirety to be conveniently handled and easily operated. When the device has been worked into the ground the required distance, the inner member 10 is pulled upwardly independently of the outer member 11 a distance to remove the auger 14 from the solid portion of the ground, and upon the limit of this independent movement of the inner member 10, both of the said members 10 and 11 can be easily withdrawn from the ground as a unit. With a device constructed in accordance with my invention a maximum amount of work can be accomplished in a minimum of time, the device being simple in construction and cheap to manufacture.

While it is believed that from the foregoing description the nature and advantages of the invention will be apparent, I desire to have it understood that what is herein shown and described is illustrative of the preferred embodiment of the invention, and that such changes may be resorted to when desired as fall within the scope of what is claimed.

What is claimed is:—

1. A post hole digger embodying inner and outer tubular members capable of relative sliding adjustment, an auger on the lower extremity of the inner member, cutting blades secured exteriorly to the outer member in the vicinity of said auger, yieldable means interposed between said members and operating to normally project said auger beyond said cutting blades and the corresponding extremity of the outer member, coöperating clutch members carried by the respective members and normally held engaged under the influence of said yieldable means, and a handle carried by the inner member for rotating the latter independently of or in unison with the outer member as described.

2. A post hole digger embodying an inner member and an outer member, said members being capable of sliding adjustment, an auger on the lower extremity of said inner member, cutting blades secured exteriorly to the outer member in the vicinity of said auger, said inner and outer members being formed to provide opposed shoulders, resilient means encircling the inner member and bearing against said opposed shoulders to normally project the auger beyond the said blades and the corresponding extremity of the outer member, coöperating clutch members carried by the respective inner and outer members of the device and normally held engaged by said yieldable means, and a handle carried by the inner member for rotating the latter independently of or in unison with the outer member as described.

In testimony whereof I affix my signature.

WALTER LUNDSTROM.

Copies of this patent may be obtained for five cents each, by addressing the "Commissioner of Patents, Washington, D. C."

It is hereby certified that in Letters Patent No. 1,237,070, granted August 14, 1917, upon the application of Walter Lundstrom, for an improvement in "Post-Hole Diggers," an error appears requiring correction as follows: In the grant and in the heading to the printed specification the residence of the patentee is given as "Almont, Montana," whereas said residence should have been given as *Almont, North Dakota:* and that the said Letters Patent should be read with this correction therein that the same may conform to the record of the case in the Patent Office.

Signed and sealed this 15th day of January, A. D., 1918.

[SEAL.]

R. F. WHITEHEAD,

*Acting Commissioner of Patents.*

Cl. 255—70.